United States Patent [19]

Partner et al.

[11] 3,996,899

[45] Dec. 14, 1976

[54] POSITIVE DISPLACEMENT CONTINUOUS COMBUSTION ENGINE

[75] Inventors: Harvey D. Partner; John C. Dickerson; Forrest D. Hansen, all of Pocatello, Idaho

[73] Assignee: Gateway of Discovery, Inc., Pocatello, Idaho

[22] Filed: Apr. 3, 1975

[21] Appl. No.: 564,835

[52] U.S. Cl. .............................. 123/8.25; 418/206; 123/8.05; 60/901; 60/39.61
[51] Int. Cl.² ........................................ F02B 53/08
[58] Field of Search .............. 123/8.23, 8.25, 8.05, 123/8.07, 8.09; 60/39.61, 39.63, 900, 901; 418/206

[56] References Cited
UNITED STATES PATENTS

| 593,514 | 11/1897 | Chaudun | 60/39.61 UX |
|---|---|---|---|
| 922,875 | 5/1909 | Fraser | 60/39.61 X |
| 3,381,670 | 5/1968 | Kincaid | 123/8.25 |
| 3,651,641 | 3/1972 | Ginter | 60/39.63 X |
| 3,708,976 | 1/1973 | Berlyn | 60/39.63 X |
| 3,782,340 | 1/1974 | Nam | 123/8.23 |
| 3,791,352 | 2/1974 | Takacs | 123/8.25 |

FOREIGN PATENTS OR APPLICATIONS

| 103,662 | 7/1926 | Austria | 123/8.25 |
|---|---|---|---|
| 1,311,308 | 10/1962 | France | 123/8.25 |

*Primary Examiner*—Clarence R. Gordon
*Attorney, Agent, or Firm*—Clarence A. O'Brien; Harvey B. Jacobson

[57] ABSTRACT

A housing defining a flow passage therethrough including inlet and outlet ends as well as a central portion intermediate the inlet and outlet ends is provided. Positive displacement gas pump structure in the form of a roots-type compressor is operatively associated with the inlet end of the passage for pumping air under pressure therethrough and into the central portion between the inlet and outlet ends which defines a combustion chamber. The roots-type compressor or pump also defines an obstruction to the reverse flow of gas under pressure from the combustion chamber outwardly of the inlet end of the passage. A positive displacement gas motor in the form of a roots-type fluid motor is operatively associated with the outlet end of the passage for developing rotary torque in response to elevated gas pressures within the combustion chamber and the passage of gas under elevated pressures from the combustion chamber, through the roots-type motor and out the outlet of the passage. The roots-type pump and motor include rotary input and rotary output shafts and a gear train drivingly connects the output shaft to the input shaft for driving the roots-type pump at a volumetric rate lower than the volumetric rate of the roots-type motor provided at the outlet end of the passage. Further, ignition structure is operatively associated with the combustion chamber for igniting a combustible mixture therein and the outlet of the passage, downstream from the roots-type motor, includes fuel injection nozzles for injecting fuel under pressure into the outlet end of the passage whereby the outlet end of the passage may function in the manner of an afterburner. Still further, temperature controlled water injection nozzles are operatively associated with the combustion chamber for injecting heated water into the combustion chamber for vaporization and heat absorption therein.

4 Claims, 3 Drawing Figures

POSITIVE DISPLACEMENT CONTINUOUS COMBUSTION ENGINE

BACKGROUND OF THE INVENTION

Various forms of positive displacement continuous combustion engines have been heretofore designed. However, some of these engines have proven to be less than efficient to a high degree and others have included various complex structures which render them not feasible from an economic standpoint. Examples of previously patented engines including some of the basic structural features of the instant invention are disclosed in U.S. Pat. Nos. 1,726,104, 2,238,905, 2,349,600, 2,619,796 and 2,940,656. Further, French Pat. No. 1,311,308, dated Oct. 24, 1961 also discloses some structural features which are similar to the various structural components of the instant invention.

SUMMARY OF THE INVENTION

The positive displacement continuous combustion engine of the instant invention is constructed in a manner whereby rotational torque may be developed through the utilization of a stationary housing, relatively simple fuel injection means and ignition means operatively associated with a combustion chamber defined by the housing and rotary pump and motor structures each including rotary components which are fully balanced and rotate about fixed axes with the result that rotary torque may be efficiently produced and with substantially no vibration being developed by the engine.

The main object of this invention is to provide a rotary engine capable of developing appreciable amounts of rotary torque and constructed in a manner whereby its operation will be substantially vibrationless.

Another object of this invention is to provide a rotary engine in accordance with the preceding objects and constructed in a manner whereby its operation will be extremely simple.

Yet another object of this invention is to provide a rotary engine which will be capable of operating at considerably greater engine speeds than is normally possible with more conventional forms of combustion engines and which will therefore develop greater amounts of power for a given weight and size of engine.

A further object of this invention is to provide a rotary engine constructed in a manner whereby external cooling fins and integral liquid coolant jackets will not be required.

Another very important object of this invention is to provide a rotary engine including afterburner structure thereby enabling the exhaust of the engine to also be utilized in driving an auxiliary engine of the turbine or external expansion type.

A final object of this invention to be specifically enumerated herein is to provide a positive displacement continuous combustion engine in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
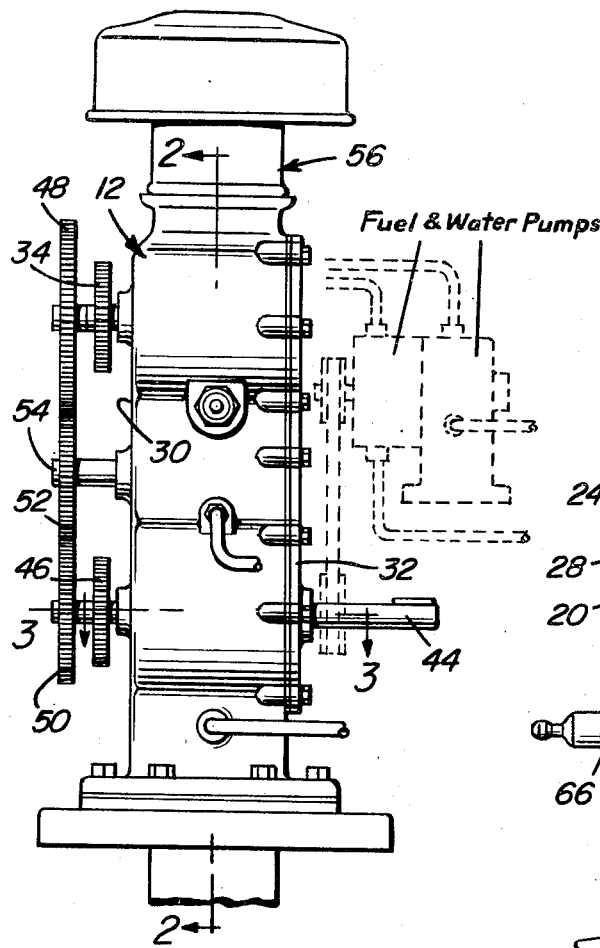
FIG. 1 is a side elevational view of a combustion engine constructed in accordance with the present invention.

Referring now more specifically to the drawings, the numeral 10 generally designates the engine of the instant invention. The engine 10 includes an elongated housing referred to in general by the reference numeral 12 including a tubular inlet end 14 and a tubular outlet end 16. An intermediate portion of the housing 12 disposed between the inlet and outlet ends 14 and 16 defines a combustion chamber 18.

Figure 2:
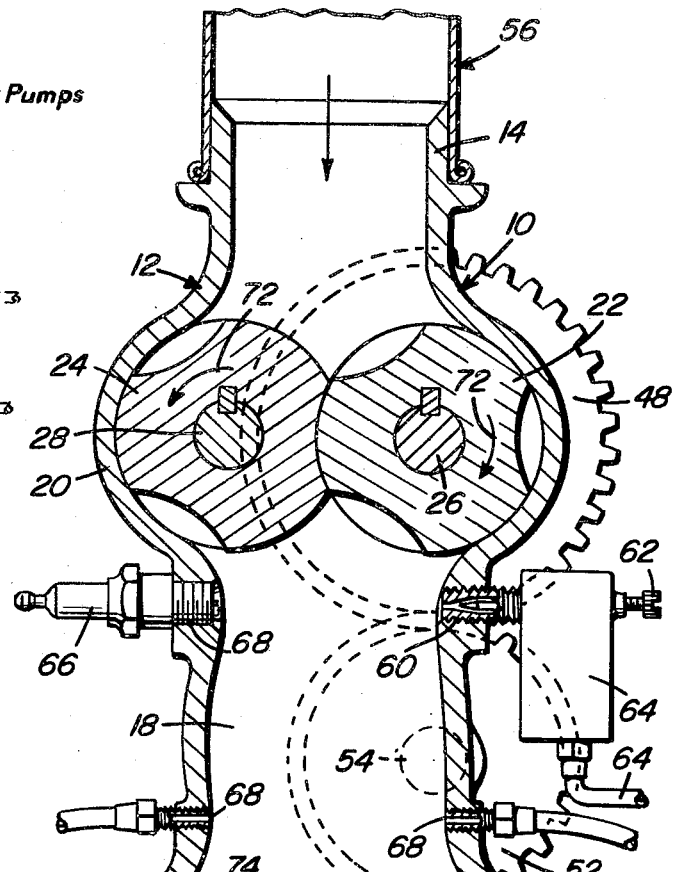
FIG. 2 is an enlarged fragmentary vertical sectional view taken substantially upon the plane indicated by the section line 2—2 of FIG. 1.
Figure 3:
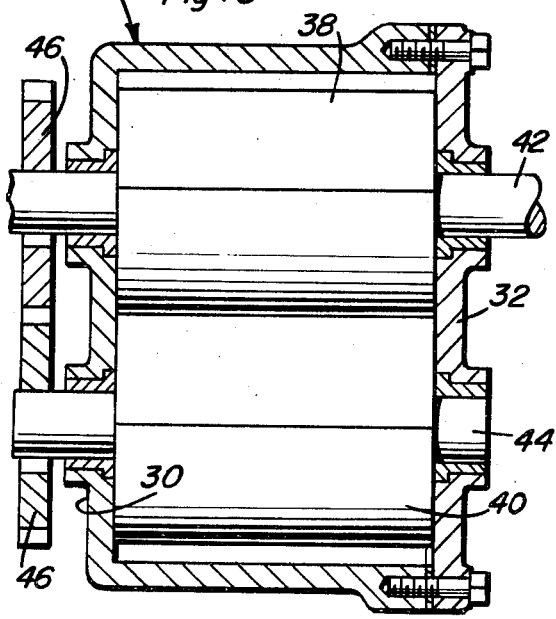
FIG. 3 is an enlarged fragmentary horizontal sectional view taken substantially upon the plane indicated by the section line 3—3 of FIG. 1.
Figure 3:
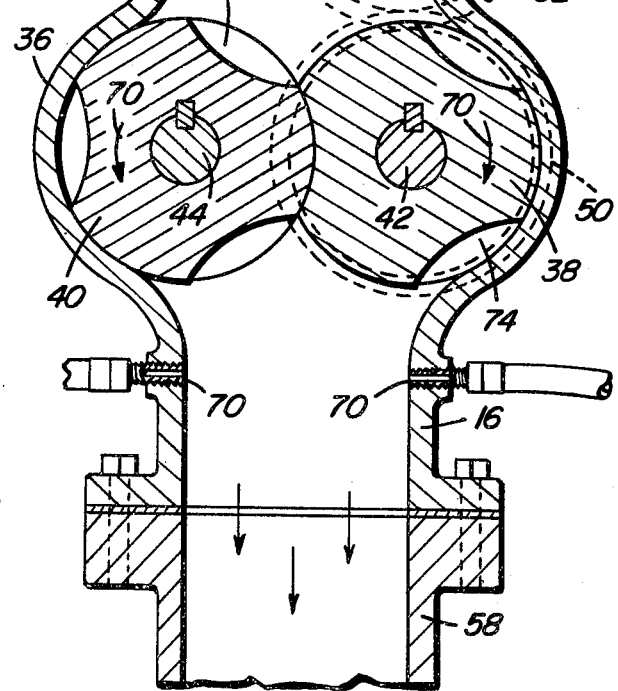

With attention now invited more specifically to FIG. 2 of the drawings, it may be seen that the inlet end portion of the housing 12 includes an intermediate portion 20 which is of a configuration to rotatably receive a pair of roots-type rotors 22 and 24 therein. The rotors 22 and 24 are mounted on shafts 26 and 28 journaled through the front wall 30 and removable rear cover 32 of the housing 12 and the shafts 26 and 28 have meshed gear wheels 34 mounted on their forward ends.

An intermediate portion 36 of the housing 12 is also of a shape to define a casing area in which to rotatably receive a second pair of roots-type rotors 38 and 40 mounted on shafts 42 and 44 also journaled through the front wall 30 and removable rear cover 32 of the housing 12. The forward ends of the shafts 42 and 44 are equipped with meshed gears 46 corresponding to the gears 34.

The forward end portions of the shafts 26 and 42 disposed immediately forward of the corresponding gear wheels 34 and 46 have large and small diameter gear wheels 48 and 50 mounted thereon and an intermediate gear wheel 52 having its diametrically opposite portions meshed with the gear wheels 48 and 50 is journaled on a stub shaft 54 which projects forwardly from the front wall 30 intermediate the shafts 26 and 42.

Accordingly, the meshed gear wheels 34 cause the rotors 22 and 24 to rotate in timed sequence with each other and the gear wheels 46 cause the rotors 38 and 40 to rotate in timed sequence with each other. In addition, the drive train including the gear wheels 50, 48 and 52 drivingly connects the rotary output shaft 42 to the rotary input shaft 26.

The inlet end 14 of the housing 12 has an air cleaner assembly referred to in general by the reference numeral 56 operatively associated therewith and the outlet end 16 has an exhaust pipe 58 operatively associated therewith.

A liquid fuel injector 60 is supported from the housing 12 and opens into the combustion chamber 18 and the injector 60 has an adjustable needle valve 62 supported from a fuel block 64 operatively associated therewith for varying the control of liquid fuel through the injector 60 and into the combustion chamber 18. Further, a pressurized fuel line 64 is provided and discharges liquid fuel under pressure from any suitable source into the fuel block 64 for subsequent discharge from the injector 60.

A spark plug 66 is threaded into a threaded bore 68 formed in the housing 12 opening into the combustion chamber 18 and the spark plug 66 is adapted to be connected to any suitable source of secondary ignition voltage. The spark plug 66 may be of the continuously operating type and its operation may be terminated after the engine 10 has once been started with subsequent combustion of fresh air and fuel being introduced into the combustion chamber 18 being automatic as a result of the high temperatures of combustion gases within the chamber 18. Further, a pair of fuel injector nozzles 68 are mounted from the housing 12 for discharging water under pressure into the combustion chamber 18. By injecting water under pressure into the combustion chamber 18 the water, which may be previously heated by any suitable means, is substantially immediately flashed into steam and thereby increases the operating pressures within the chamber 18. Further, the flashing of water injected into the combustion chamber 18 into steam provides a means whereby excess temperatures of the combustion of air and fuel within the chamber 18 may be absorbed therefrom.

The outlet end 16 of the housing 12 includes additional fuel injector nozzles 70 opening thereinto downstream from the rotors 38 and 40 and the nozzles 70 may be operatively communicated with any suitable source of fuel under pressure for injecting fuel into the outlet end 16 for burning in the manner of an afterburner. In this manner, the exhaust gases entering the exhaust pipe 58 may be ducted to a suitable turbine engine of the auxiliary type or ducted to an auxiliary positive displacement expansion engine.

In operation, liquid fuel is injected into the combustion chamber 18 (the latter having been purged of exhaust gases therein by rotation of the rotors 38 and 40 while coasting to a stop at termination of the last operation of the engine) and the spark plug 66 is placed into operation resulting in initial combustion of air and fuel within the chamber 18. The pressure of expanding gases within the chamber 18 causes the rotors 38 and 40 to rotate in the direction of the arrows 70 and this in turn imparts rotational torque to the rotors 22 and 24 in order to rotate the latter in the direction of the arrows 72. Thus, the engine 10 is of the self-starting type. Accordingly, fresh air is pumped into the chamber 18 by the rotors 22 and 24. However, some exhaust gases will remain in the chamber 18 even though the volumetric flow of the rotors 38 and 40 is greater than the volumetric flow of the rotors 22 and 24. This remnant of exhaust gases within the chamber 18 elevates the compression ratio of gas and fuel being pumped into the chamber 18 and therefore the pressures within the chamber 18 gradually build up until there is sufficient pressures within the pockets 74 in the rotors 38 to insure sufficient discharge of exhaust gases from the combustion chamber 18 via the rotors 38 and 40 to prevent a further buildup of combustion gas pressures within the chamber 18. Of course, operation of the water injectors 68 provides further power for the engine 10 and also provides for internal cooling of the combustion chamber 18. Further, the fuel injectors 70 may be used for afterburner operation of the engine 10 in the event the exhaust gases are to be ducted to the working chamber of an auxiliary external expansion engine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A continuous combustion engine comprising passage means defining a flow passage having inlet and outlet ends and a central portion intermediate said ends defining a combustion chamber, positive displacement roots type gas pump means operatively associated with said inlet end for pumping gas under pressure therethrough into said combustion chamber and, during operation of said pump means to prevent reverse flow of gas under pressure therepast, positive displacement gas roots type motor means operatively associated with said outlet end for developing rotary torque in response to elevated gas pressure in said combustion chamber and passage of said elevated gas pressures therethrough, said motor and pump means including rotary output and input shaft means, respectively, drive means drivingly connecting said output shaft means to said input shaft means for driving said pump means at a volumetric rate lower than the volumetric rate of said motor means, ignition means operatively associated with said combustion chamber for igniting a combustible mixture therein, said inlet end comprising an air inlet, and fuel injection means operatively associated with said combustion chamber for injecting fluid fuel under pressure directly into said combustion chamber, whereby an initial combustible mixture of air and fuel, at substantially ambient pressure, may be formed in said combustion chamber subsequent to a previous termination of operation of said engine and ignited by said ignition means for initially elevating the gas pressure in said combustion chamber sufficient to cause operation of said motor means, and thus said pump means, whereby a subsequent mixture of air and fuel at greater than ambient pressure may be formed in said chamber and ignited therein for continued operation of said engine.

2. The combination of claim 1 wherein said drive means comprises a gear train including gear wheels mounted on said shaft means for rotation therewith.

3. The combination of claim 1 including water injection means operatively associated with said combustion chamber for injecting water under pressure into said combustion chamber for vaporization therein and absorption of heat energy therefrom.

4. The combination of claim 3 wherein said drive means comprises a gear train including gear wheels mounted on said shaft means for rotation therewith.

* * * * *